United States Patent [19]

Morris et al.

[11] Patent Number: 5,280,966
[45] Date of Patent: Jan. 25, 1994

[54] CONDUIT CONNECTOR FOR NON-METALLIC ENCLOSURES

[75] Inventors: James M. Morris, High Ridge; Joseph H. Kuczka, Fenton, both of Mo.

[73] Assignee: Hubbell Incorporated, Orange, Conn.

[21] Appl. No.: 842,003

[22] Filed: Feb. 25, 1992

[51] Int. Cl.$^5$ ............................................. F16L 19/00
[52] U.S. Cl. ...................................... 285/89; 285/184; 285/281
[58] Field of Search ....................... 411/222, 231, 301; 285/89, 281, 280, 341, 907, 161, 162, 184, 282; 174/65 R, 65 SS

[56] References Cited

U.S. PATENT DOCUMENTS

| | | | |
|---|---|---|---|
| 134,823 | 1/1873 | Todd | 411/222 |
| 818,584 | 4/1906 | Treatt | 411/222 |
| 909,033 | 1/1909 | Smith | 411/222 |
| 1,742,722 | 1/1930 | Olsson et al. | 411/222 |
| 2,449,588 | 9/1948 | Clafford | 285/89 |
| 3,346,709 | 10/1967 | Appleton | 200/51.09 |
| 3,699,276 | 10/1972 | Atakkaan | 200/16 A |
| 3,799,589 | 3/1974 | Boelkins | 285/281 |
| 3,893,719 | 7/1975 | Eidelberg et al. | 174/65 R |
| 4,247,134 | 1/1981 | Yergen | 285/184 |
| 4,260,863 | 4/1981 | Appleton | 200/144 R |
| 4,822,080 | 4/1989 | Darish | 285/184 |

OTHER PUBLICATIONS

Advertisement—Appleton Electric Company (undated).
Advertisement—Crouse-Hinds Electrical Construction Materials (undated).

Primary Examiner—Eric K. Nicholson
Attorney, Agent, or Firm—Jerry M. Presson; Alfred N. Goodman

[57] ABSTRACT

A connector for connecting electrical conduit to non-metallic electrical enclosures includes a connector body, a locking ring, and a conduit nut rotatably mounted on the connector body. The connector body has a first threaded end threadedly connected to the enclosure and a second end rotatably coupled to the conduit nut. The second end has an outwardly extending radial flange which mates with an inwardly extending radial flange on the conduit nut to rotatably couple the conduit nut to the body, without limiting rotational movement of the conduit nut on the body. The conduit nut has internal threads to mate with the male threads of an electrical conduit. The assembly allows an electrical conduit to be connected securely to the enclosure by tightening the conduit nut onto the conduit without transferring torsional stress to the non-metallic enclosure. The locking ring is threadedly coupled to the connector body and can be rotated to lock the conduit nut in place.

17 Claims, 2 Drawing Sheets

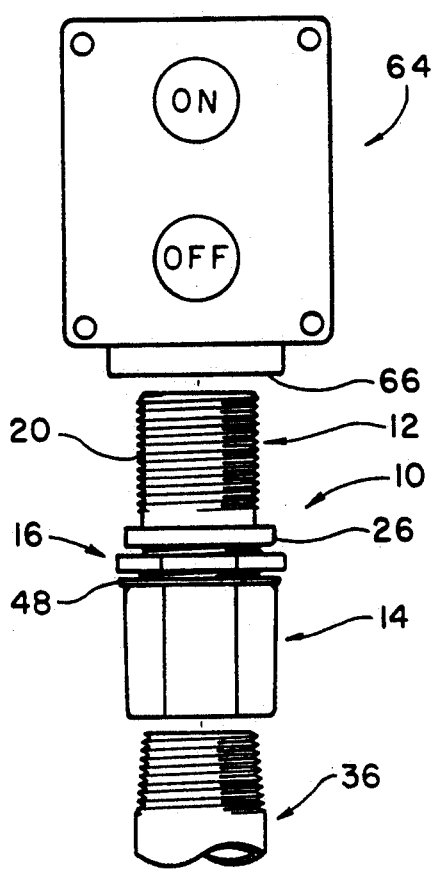
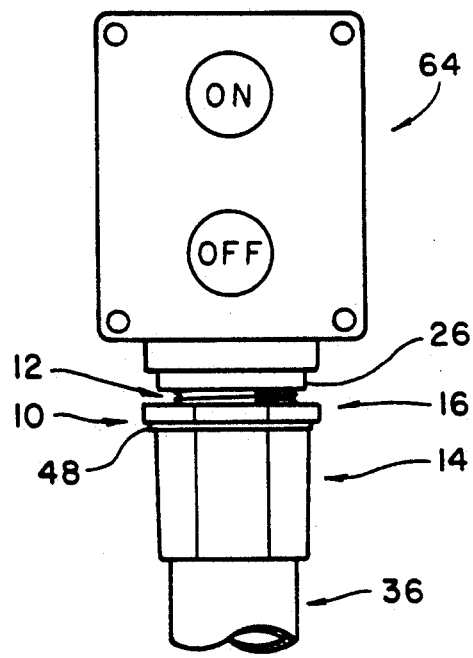
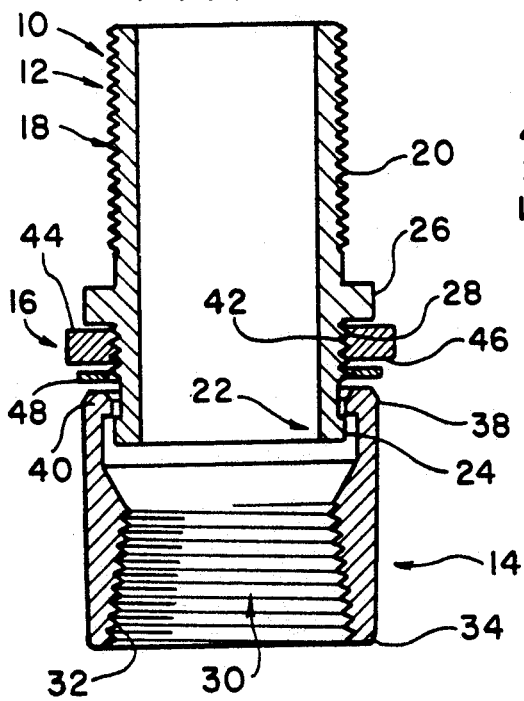
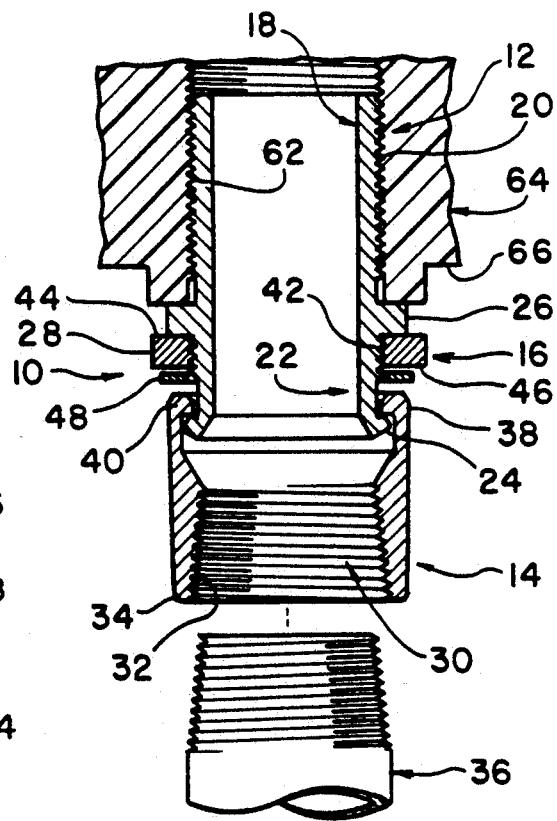

5,280,966

CONDUIT CONNECTOR FOR NON-METALLIC ENCLOSURES

FIELD OF THE INVENTION

The present invention is directed to a connector for coupling a threaded electrical conduit to a non-metallic electrical enclosure. More particularly, the invention relates to a threaded connector which prevents torque from being transferred through the connector to the non-metallic enclosure while the conduit is being coupled to the connector.

BACKGROUND OF THE INVENTION

Non-metallic enclosures are well known in the electrical industry. These non-metallic enclosures have the advantage of being relatively inexpensive to produce, light weight, and easy to install. In addition, non-metallic enclosures provide an insulating housing for the electrical components contained therein. Typically, non-metallic enclosures are provided with a machined hub extending through the wall of the enclosure for the entry of wiring and other circuitry. The hub further provides a mechanism for coupling the enclosure to a conduit carrying electrical wiring and provides a moisture resistant connection between the conduit and the enclosure. The hub is usually factory installed on the electrical enclosure. The hub generally comprises a male threaded end for threadedly coupling the hub to the enclosure. The enclosure is then installed at the work site and coupled to the conduit.

The conduit in many electrical applications includes a threaded end for coupling the conduit to the electrical enclosure. Accordingly, the hub which has been factory installed in the enclosure includes an internally threaded portion for coupling the conduit to the enclosure. The electrical connection is made by threading the conduit into the hub and the enclosure, followed by feeding electrical wires and circuitry through the hub and conduit. To obtain a weatherproof seal between the conduit and the hub, sufficient torque must be applied to the conduit to tighten the conduit to the hub. In tightening the conduit, torque is transferred directly through the solid hub to the enclosure. This transfer of torque to the enclosure often results in the hub being sheared off the enclosure, resulting in a loose and non-weather tight seal between the hub and the enclosure.

In the past, efforts have been made to prevent or minimize damage to the enclosure caused by over tightening the conduit on the hub. One such method has been to increase the thickness of the enclosure to sufficiently strengthen the wall to withstand the torque being transferred to the enclosure. This method has not been altogether satisfactory and has still resulted in failure of the coupling between the hub and the enclosure. In addition, thickening the enclosure increases the weight of the enclosure and increases manufacturing costs. Other devices which have been produced to prevent failure of the enclosure caused by over tightening the conduit on the hub include the use of a solid hub which is attached to the non-metallic enclosure. The solid hub includes a threaded portion which extends through a hole in the enclosure wall and is secured to the enclosure by a threaded backing ring applied from within the enclosure. The threaded ring is tightened on the threaded portion of the hub against the wall of the enclosure to tighten the hub onto the enclosure and produce a weather-tight seal. The solid hub further includes an internally threaded portion for coupling with a threaded conduit. As the conduit is threaded into the hub and tightened, the hub assembly will rotate before the enclosure is damaged. This type of device, however, has not been entirely satisfactory in preventing damage to the enclosure. In addition, the hub is more difficult to install and secure to the enclosure. The ring may further loosen as the hub rotates when the conduit is screwed into the hub.

Other efforts to minimize damage to the enclosure include the use of a separate union connecting to the hub and to the threaded conduit. The union, however, must also be connected to the hub and can result in damage to the enclosure. In addition, the use of a union increases manufacturing and installation costs.

SUMMARY OF THE INVENTION

The present invention overcomes the disadvantages and limitations of the previous hub assemblies for coupling a conduit to an electrical enclosure while providing a connector which will not damage the electrical enclosure. Accordingly, a primary object of the invention is to provide an electrical enclosure with a rotatable connector for coupling a conduit to the enclosure.

Another object of the invention is to provide a connector device for an electrical enclosure which prevents torque from being transferred to the enclosure while being connected to the conduit.

Another object of the invention is to provide an electrical enclosure having a connector which eliminates the need for strengthening the enclosure walls and eliminates the need for an auxiliary union.

Another object of the invention is to provide an electrical enclosure having a rotatable connector for coupling with a threaded conduit and a locking nut to prevent separation of the connector from the conduit.

A further object of the invention is to provide an electrical enclosure and connector assembly that is relatively simple to manufacture, assemble, and operate.

The foregoing objects are basically attained by providing a connector for coupling a threaded conduit to an electrical enclosure, the connector comprising a hollow body having first and second ends, and a first coupling device for coupling the first end of the body to the enclosure; a conduit nut having first and second ends, the first end of the conduit nut including a second coupling device to threadedly couple the conduit nut to the threaded conduit; and a coupling device for rotatably coupling the second end of the conduit nut to the second end of the hollow body.

The objects of the invention are further attained by providing a connector for coupling a threaded conduit to an electrical enclosure, the connector including a hollow body having a first threaded end for coupling with the enclosure, a second end having a threaded portion, and a radial flange extending outwardly from the body at the second end; a locking ring coupled to the threaded portion on the second end; and a conduit nut having a first end with an internal threaded portion for coupling with a threaded conduit, and a second end having a radial flange extending inwardly for coupling with said outwardly extending radial flange to rotatably couple the conduit nut to the hollow body.

BRIEF DESCRIPTION OF THE DRAWINGS

Referring to the drawings which form a part of this disclosure:

FIG. 1 is a front elevational view of the electrical enclosure, the connector and the conduit separated from one another in accordance with the present invention;

FIG. 2 is a front elevational view of the electrical enclosure, connector and conduit fully coupled together;

FIG. 3 is a cross-sectional view of the connector during assembly and before the end of the body is flared outward to couple the conduit nut to the body;

FIG. 4 is a cross-sectional view of the electrical enclosure coupled to the completely assembled connector in a first embodiment of the invention, before the threaded conduit is coupled to the connector;

DETAILED DESCRIPTION OF THE INVENTION

Figure 5:
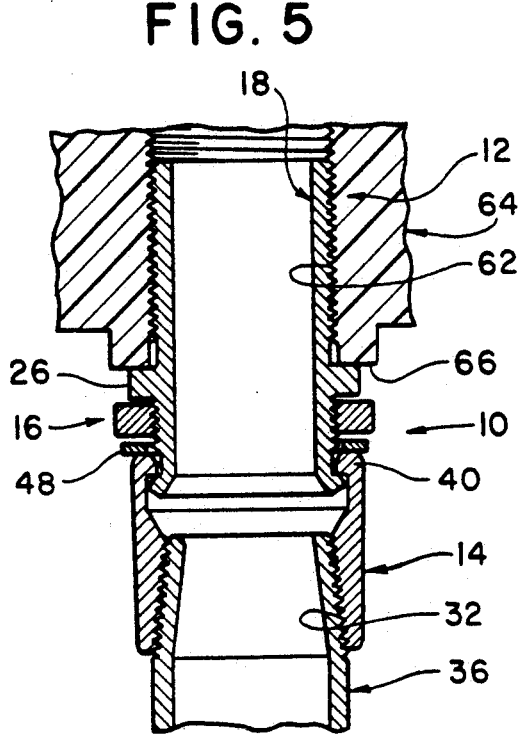
FIG. 5 is a cross-sectional view of the electrical enclosure coupled to the connector of the embodiment shown in FIG. 4, with the threaded conduit coupled to the connector and the locking ring in the un-locked position.
Figure 6:
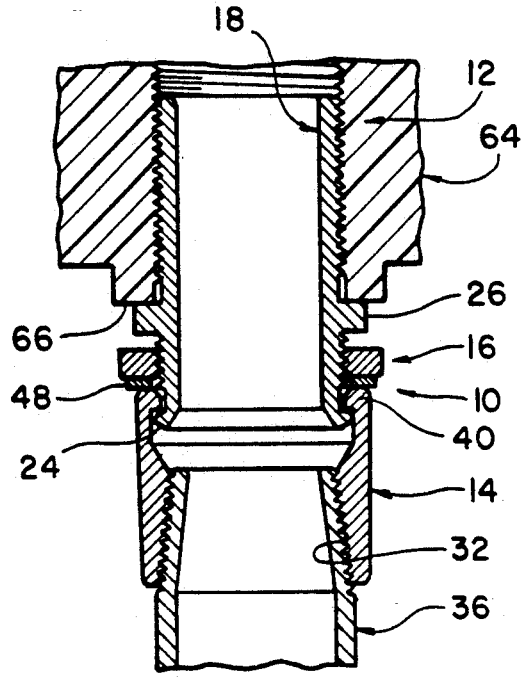
FIG. 6 is a cross-sectional view of the electrical enclosure and the connector of FIG. 5 with the locking ring in the locked position.

As seen in FIGS. 1–6, the connector 10 in accordance with the invention comprises a hollow connector body 12; a conduit nut 14; and a locking ring 16. The conduit nut 14 is rotatably coupled to one end of the hollow body 12. The locking ring 16 is axially threaded on the hollow body 12 to lock the conduit nut 14 and prevent undesired rotation of the nut.

The hollow body 12 is preferably substantially cylindrical, is made of metal, and is dimensioned to permit electrical wires and electrical circuitry to pass through the center of the body. As seen in FIGS. 3 and 4, the hollow body 12 includes a first end 18 and a male externally threaded portion 20. A second end 22 of the hollow body 12 includes a depending flange 24 extending radially outward from the hollow body 12. As shown in FIG. 4, the second end 22 of the hollow body 12 is swaged or flared outwardly. An annular collar 26 is integrally formed with the hollow body 12 and extends radially outward therefrom. The second end 22 of the hollow body also includes an externally threaded portion 28 which is disposed between the collar 26 and the radial flange 24.

The conduit nut 14 is preferably made of metal and has a substantially hexagonal outer configuration as best shown in FIG. 1. Conduit nut 14 has a central through opening 30 and internal tapered threads 32 at a first end 34 thereof as seen in FIGS. 3 and 4 for coupling to a threaded conduit 36. The second end 38 of the conduit nut 14 has a flange 40 extending radially inward. The flange 40 of the conduit nut 14 cooperates with the flange 24 on the hollow body 12 to rotatably couple the nut to the hollow body 12.

Locking ring 16 is preferably formed of metal and has a hexagonal outer configuration for receiving a wrench or other tool. The locking ring 16 includes internal threads 42 for threadedly engaging the threads 28 on the hollow body 12. As best shown in FIG. 4, the locking ring has a first axial, upwardly directed face 44 and a second axial, downwardly directed face 46. The axial face 46 may have a knurled surface to resist loosening of the locking ring when tightened against the conduit nut 14 due to vibrations or thermal expansion or contraction. An optional ring gasket 48 is positioned adjacent the second axial face 46 of the locking ring 16 as shown in FIG. 3.

The connector 10 is particularly adapted for use with non-metallic electrical enclosures. Such enclosures are typically formed from a plastic material which does not have sufficient strength to withstand excessive torque during the assembly of the connector and conduit. The non-metallic electrical enclosure 64 contains components, such as for example a switch, as depicted in FIGS. 1 and 2. Alternatively, the enclosure may contain an electrical receptacle or other component where a weather-tight connection is desired. As shown in FIGS. 1 and 2, the enclosure 64 is provided with a single connector 10. The enclosure may include a plurality of openings where each opening receives a connector.

The hollow body 12, the locking ring 16, and the conduit nut 14 in the preferred embodiment of the invention is formed of metal. The components may alternatively be formed from a plastic material depending on the environment which the connector is to be used. For most uses, the components will be of metal to ensure the necessary strength to withstand tightening during coupling with the conduit and suitable ground connection.

The gasket 48 is optionally positioned between the locking ring 16 and the conduit nut 14. The gasket 48 is preferably a compressible, deformable material to form a weather-tight connection between the conduit nut 14 and the locking ring 16 on the hollow body 12. The gasket may be formed of metal or a non-metallic material. In still a further embodiment of the invention, a lock-washer may be employed in place of the gasket to resist loosening of the locking ring during use due to vibrations and thermal expansion and contraction.

Assembly and Operation

In assembling the connector in accordance with the invention, the locking ring 16, as seen in FIG. 3, is placed on the hollow body by sliding it over the flange 24 on the second end 22 of the hollow body and threading the ring onto the threads 28 on the body. The optional gasket 48 is then placed on the hollow body by sliding it over the second end 22 and placing it against the axial face 46 of the locking ring 16. The second end 38 of the conduit nut 14 is coupled to the hollow body by sliding the nut over the flange 24 on the second end 22 of the hollow body as best shown in FIG. 3. After sliding the conduit nut 14 onto the hollow body, the second end 22 of the hollow body is flared or swaged outwardly using a suitable tool so that the flange 24 on the hollow body and the flange 40 on the conduit nut 14 overlap to retain the nut 14 on the hollow body 12. As shown in FIG. 4, after flaring the flange 24, the flange 24 is slightly spaced from the inner surface of the conduit nut and is aligned axially and overlaps with the flange 40 of the conduit nut 14 to prevent the conduit nut from sliding axially off of the body 12. Preferably, the second end 22 of the hollow body is flared such that the conduit nut 14 is freely rotatable with respect to the hollow body 12.

In operation, the assembled connector 10 is first threaded into a threaded opening 62 in the electrical enclosure 64 as best shown in FIG. 4. The connector 10 is completely threaded into the electrical enclosure so that the collar 26 abuts the outer surface 66 of the electrical enclosure 64. The collar 26 serves as a stop member to secure the connector 10 to the electrical enclosure and to provide a weatherproof seal between the connector 10 and the enclosure 64. Preferably, the connector is threaded into the enclosure and tightened to form a snug, weatherproof connection. Over-tightening should be avoided to reduce the risk of damaging the enclosure or the connector. An optional gasket (not shown) may also be positioned between the collar 26 and the enclosure surface 66 to ensure a weatherproof connection.

As shown in FIG. 5, the conduit 36 is next threaded into the threaded portion 32 of the conduit nut 14. During connection of the conduit 36 with the conduit nut 14, the conduit nut 14 may be rotated with respect to the hollow body 12 and the conduit 36. A wrench is preferably used to tighten the conduit nut 14 securely to the conduit 36. Alternatively, the conduit nut may be held in a fixed position by a wrench or other tool, and the conduit rotated to thread the conduit into the nut. Regardless of which method of assembly is used, the conduit may be securely tightened to the connector without transferring excessive torque to the enclosure, thereby preventing damage to the enclosure or stripping the connector from the enclosure. The conduit nut 14 will spin freely with respect to the body 12 until the locking ring is tightened against the conduit nut.

Once the conduit 36 is secured to the conduit nut 14, the locking ring 16 is rotated to fully tighten the ring 16 against the conduit nut 14 and to compress the gasket 48. The assembly provides a weatherproof connection between the enclosure 64 and the threaded conduit 36. The weatherproof connection has been attained without transferring the torque to the enclosure 64 or damaging the enclosure and the conduit.

Figure 7:
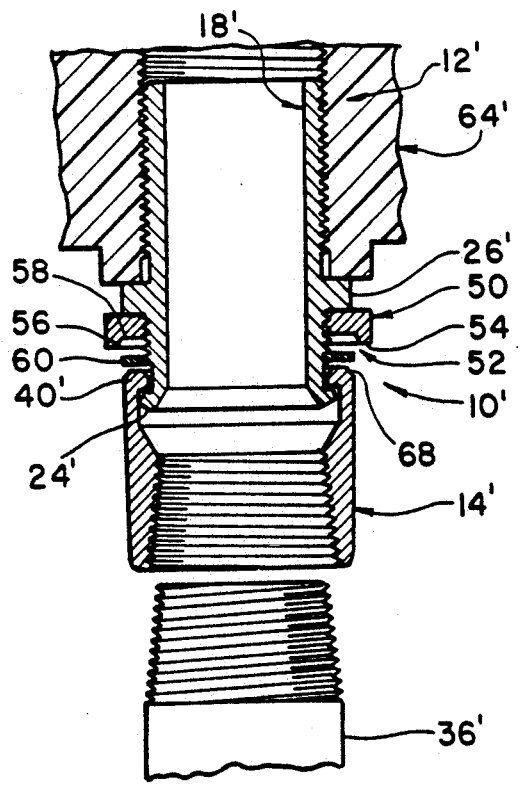
FIG. 7 is a cross-sectional view of the electrical enclosure coupled to the connector of an alternative embodiment of the invention having a recess in the locking ring, before the threaded conduit is coupled to the connector and with the locking ring in the unlocked position.
Figure 8:
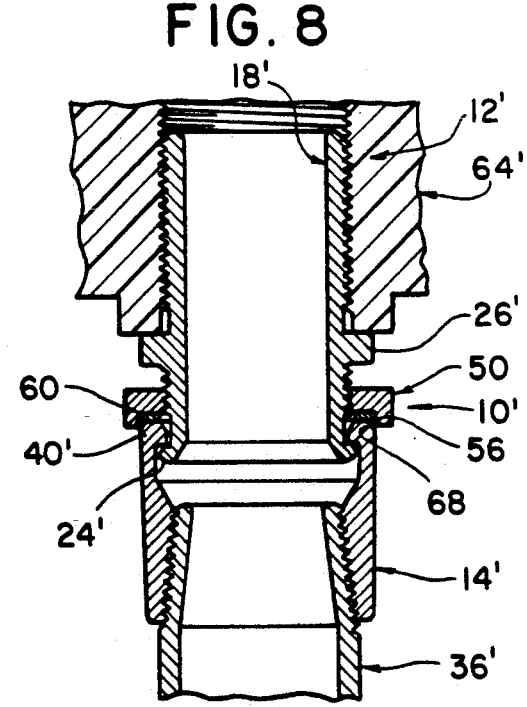
FIG. 8 is a cross-sectional view of the electrical enclosure and connector of the embodiment shown in FIG. 7 except with the threaded conduit coupled to the connector and the locking ring rotated into the locking position.

Embodiment of FIGS. 7 and 8

A second embodiment of connector 10' shown in FIGS. 7 and 8 includes a locking ring 50 having an annular recess 52 in the axial face 54 of the locking ring 50. The annular recess 52 includes a frustoconical, inclined surface 56 and a planar bottom portion 58. Frustoconical surface 56 ultimately mates with frustoconical surface 68 on the top of conduit nut 14'. A gasket 60 is disposed adjacent the bottom portion 58 of the recess 52. The remaining elements are the same as those described above regarding FIGS. 1-6, and are given the same reference numerals with the addition of a prime.

In the embodiment shown in FIGS. 7 and 8, the assembly and operation of the connector 10' is substantially the same as the embodiment of FIGS. 1-6. The modified connector is constructed in a fashion similar to that shown in FIG. 3 and FIG. 4, except that the locking ring 50 includes the annular recess 52.

Accordingly, the connector 10' includes a hollow body 12', a conduit nut 14' and a locking ring 50. In this embodiment, the first end 18' of the hollow body is threaded into the electrical enclosure 64', and the threaded conduit 36' is threaded onto the conduit nut 14'. The locking ring 50 is then tightened against the second end of the conduit nut 14' to compress the gasket 60 and lock the conduit nut 14' with respect to the hollow body 12'. As best shown in FIG. 7, the annular recess 52 on the locking ring 50 includes an inclined surface 56 which mates with a complementary inclined surface 68 on the conduit nut 14'. As the locking ring 50 is tightened against the conduit nut 14', the inclined surfaces 56 and 68 engage to further provide a weatherproof seal between the locking ring and the conduit nut 14'.

While advantageous embodiments have been chosen to illustrate the invention, it will be understood by those skilled in the art that various changes and modifications can be made therein without departing from the scope of the invention as described in the appended claims.

What is claimed is:

1. A connector for coupling a threaded conduit to an electrical enclosure, said connector comprising:
    a hollow body having first and second ends, and first coupling means for coupling said first end of said body to the enclosure;
    a conduit nut having first and second ends, said first end of said conduit nut including second coupling means to threadedly couple said conduit nut to the threaded conduit;
    means for rotatably coupling said second end of said conduit nut to said second end of said hollow body; and
    locking means, located on said body between the enclosure and said second end of said conduit nut and movable axially away from the enclosure into engagement with said second end of said conduit nut, for preventing any torque from being applied to the enclosure as said conduit nut is being secured to said body.

2. A connector according to claim 1, wherein said first coupling means comprises a threaded portion on said first end of said body for threadedly coupling to said enclosure.

3. A connector according to claim 1, wherein said means for rotatably coupling comprises an outwardly extending radial flange on said second end of said body, and an inwardly extending radial flange on said second end of said conduit nut cooperating with said radial flange of said body.

4. A connector according to claim 1, wherein said locking means comprises a locking ring threadedly engaging a second threaded portion on said body and spaced from said second end of said body.

5. A connector according to claim 4, wherein said locking means comprises a gasket means disposed between said locking ring and said conduit nut.

6. A connector according to claim 4, and further comprising
    an outwardly extending collar on said body, said collar being disposed between said first and second ends of said body to limit movement of said locking ring and to limit coupling of said first end of said body with the enclosure.

7. A connector according to claim 4, wherein said locking ring further includes a substantially frustoconical surface on one face thereof, and said second end of said conduit nut includes a substantially frustoconical surface to mate with said frustoconical surface in said locking ring.

8. A connector according to claim 3, wherein said second end of said body is swaged outwardly.

9. A connector for coupling threaded conduit to an electrical enclosure, the combination comprising:
- a hollow body, spaced apart from the conduit and having first and second ends, said first end including coupling means for coupling said hollow body to the enclosure, said second end including an outwardly extending radial flange; and
- a conduit nut having first and second ends, said first end including coupling means to threadedly couple said conduit nut to the conduit, said second end including an inwardly extending radial flange rotatably coupling said conduit nut on said second end of said body,
- said second end of said body including locking means movable axially relative to said conduit nut and the enclosure into engagement with said radial flange of said conduit nut to prevent rotation of said conduit nut with respect to said body and prevent torque from being applied to the enclosure as said conduit nut is being secured to said body.

10. A connector according to claim 9, wherein said coupling means for coupling said first end of said body to said enclosure comprises a threaded portion for threadedly coupling to said enclosure.

11. A connector according to claim 10, and further comprising
- an outwardly extending collar located between said first and second ends of said body and being adjacent said threaded portion.

12. A connector according to claim 9, wherein said locking means comprises a threaded portion on said second end of said body, and a threaded locking ring coupled to said threaded portion on said second end and engagable with said conduit nut.

13. A connector according to claim 9, wherein said locking means comprises a gasket means associated with said locking means to seal against said conduit nut.

14. A connector according to claim 12, wherein
- said locking ring includes an inner frustoconical surface, and
- said second end of said conduit nut includes a mating outer frustoconical surface complementing said inner frustoconical surface.

15. A connector for coupling a threaded conduit to an electrical enclosure, said connector comprising:
- a hollow body spaced apart from the conduit and having a first male threaded end for coupling with the enclosure, a second end having a threaded portion, and a radial flange extending outwardly from said body at said second end;
- a locking ring coupled to said threaded portion on said second end of said hollow body between the enclosure and said second end of said conduit nut; and
- a conduit nut having a first end with an internal threaded portion for coupling with the threaded conduit, and a second end having a radial flange extending inwardly for coupling with said outwardly extending radial flange to rotatably couple said conduit nut to said hollow body,
- said locking ring being movable axially away from the enclosure into engagement with said radial flange of said conduit nut to prevent torque from being applied to the enclosure as said conduit nut is being secured to said body.

16. A connector according to claim 15, wherein said second end of said body is flared radially outwardly.

17. A connector according to claim 15, and further comprising
- gasket means disposed between said locking ring and said conduit nut.

* * * * *